INVENTOR.
ROYAL C. McCLAY
BY
W. W. Beatty
ATTORNEY

March 1, 1949.  R. C. McCLAY  2,463,043
INTERMITTENT CAMERA MECHANISM
Filed Aug. 13, 1945  7 Sheets-Sheet 2

INVENTOR
ROYAL C. McCLAY
BY
ATTORNEY

March 1, 1949.　　　R. C. McCLAY　　　2,463,043
INTERMITTENT CAMERA MECHANISM
Filed Aug. 13, 1945　　　7 Sheets-Sheet 4

INVENTOR.
ROYAL C. McCLAY
BY
ATTORNEY

March 1, 1949.   R. C. McCLAY   2,463,043
INTERMITTENT CAMERA MECHANISM
Filed Aug. 13, 1945   7 Sheets-Sheet 5

INVENTOR.
ROYAL C. McCLAY
BY
ATTORNEY

March 1, 1949. R. C. McCLAY 2,463,043
INTERMITTENT CAMERA MECHANISM
Filed Aug. 13, 1945 7 Sheets-Sheet 6

INVENTOR.
ROYAL C. McCLAY
BY
ATTORNEY

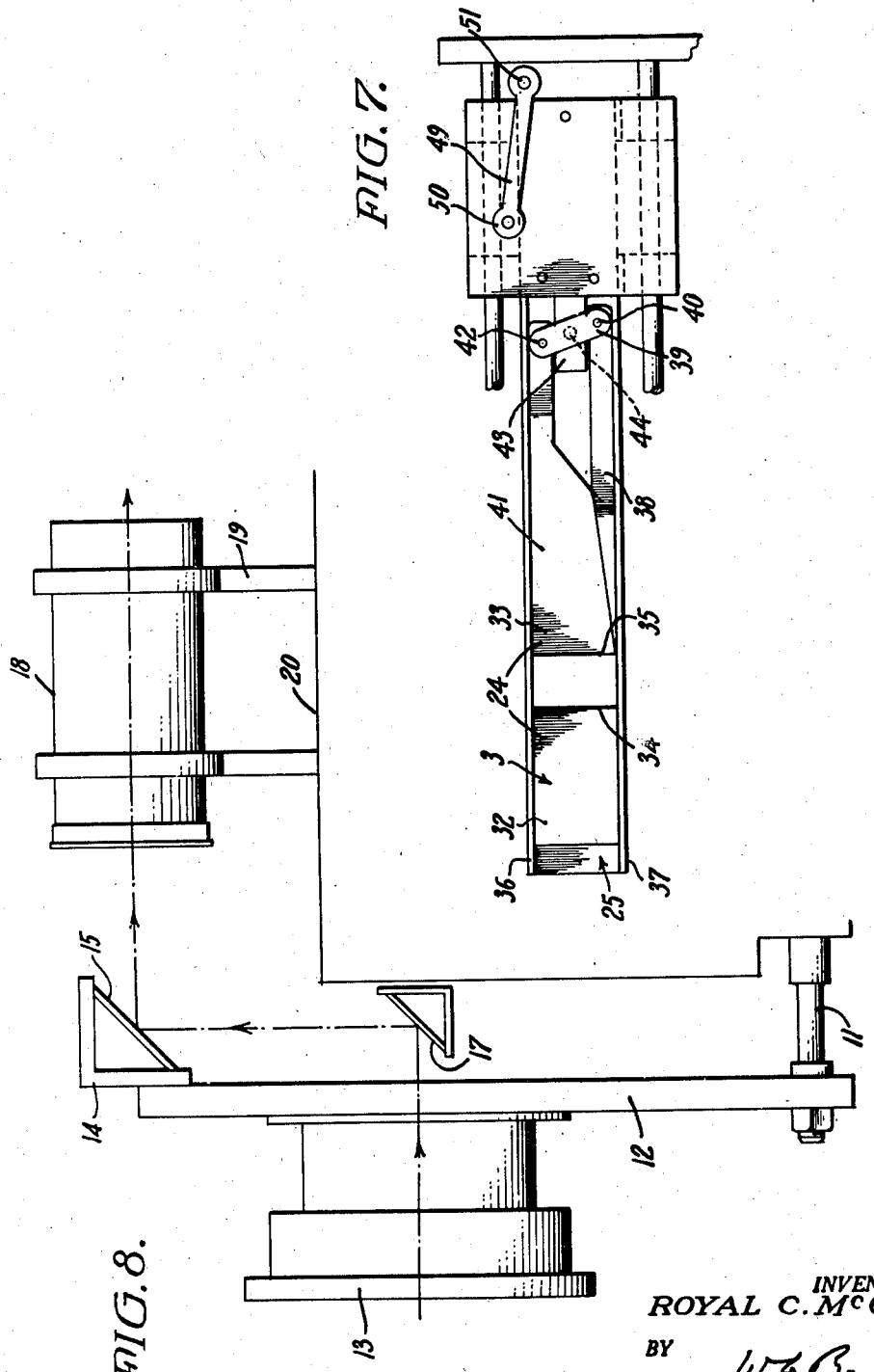

Patented Mar. 1, 1949

2,463,043

UNITED STATES PATENT OFFICE 2,463,043

INTERMITTENT CAMERA MECHANISM

Royal C. McClay, Burbank, Calif., assignor, by mesne assignments, to Warner Bros. Pictures, Inc., New York, N. Y., a corporation of Delaware Application August 13, 1945, Serial No. 610,614

7 Claims. (Cl. 88—18.4)

The present invention relates to a camera, particularly a motion picture camera and has for an object to provide an improved film traversing mechanism and an improved drive mechanism therefor which are quiet in operation.

The usual motion picture camera is so noisy in operation that it is necessary to provide a blimp, or a special sound-proof casing to suppress the noise of the working parts of the camera, when the camera is used in the neighborhood of a microphone for the synchronous recording of sound and picture.

The present invention relates to an improved camera drive mechanism which is quiet in operation whereby the sound proofing heretofore required may be substantially reduced or eliminated entirely.

The invention is accomplished by employing spiral gears to drive certain of the camera parts and in particular by employing rocking shafts to drive the film pull-down and register mechanism, with cams and cam rollers for imparting rocking movement to the rock shafts. Such cams and their followers, also spiral gears are quiet in their operation, and a low noise level is further assured by arranging such mechanism in a lubricating well.

Another feature of the invention relates to an improvement made possible by the use of such cams, and to an improved pull-down mechanism, whereby it is possible to obtain a full shutter opening or photographic rest period of the film, for substantially more than 180°.

The improved viewfinder and adjustable shutter and the drive therefor are disclosed and claimed in co-pending application S. N. 610,613, filed August 13, 1945, for Camera, now abandoned.

For further details of the invention reference may be made to the drawings wherein Fig. 1 is a side view in elevation, partly in section of a camera according to the present invention, the view being taken in the direction of the arrows on line 1—1 in Fig. 3 with parts broken away.

Fig. 7 is a rear view in elevation of the combined shutter and viewfinder mechanism.

Fig. 8 is a schematic view in elevation of the viewfinder.

Figure 1:
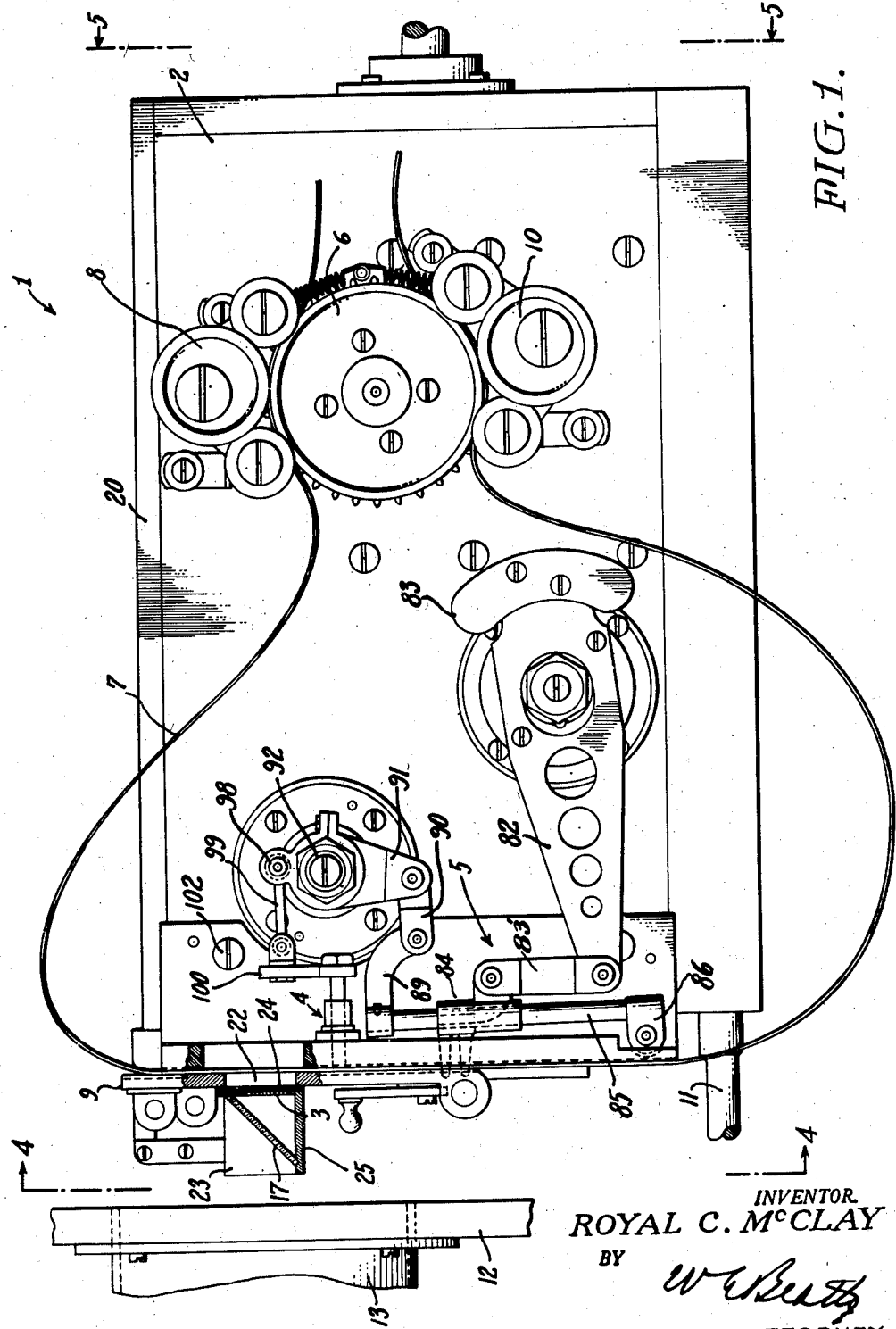

Referring in detail to the drawings, the camera I of this invention comprises a rectangular fluid tight casing 2 serving as a lubricating well for a fluid lubricant, the driving mechanism for the reciprocating shutter 3 (see Figs. 1, 2, 3, 4 and 7) and for the pilot pin or register mechanism 4 (see Fig. 6) and for the claw or pull-down mechanism 5 and for the common supply and take-up sprocket 6 (see Fig. 1), being arranged in the lubricating well provided by the casing 2. Referring to Fig. 2 which shows a vertical section of the casing 2, fluid lubricant may be placed therein to a height of approximately one-quarter or one-fifth of the height of the casing 2, so that moving parts therein will pick up oil and carry it to other moving parts.

Figure 2:
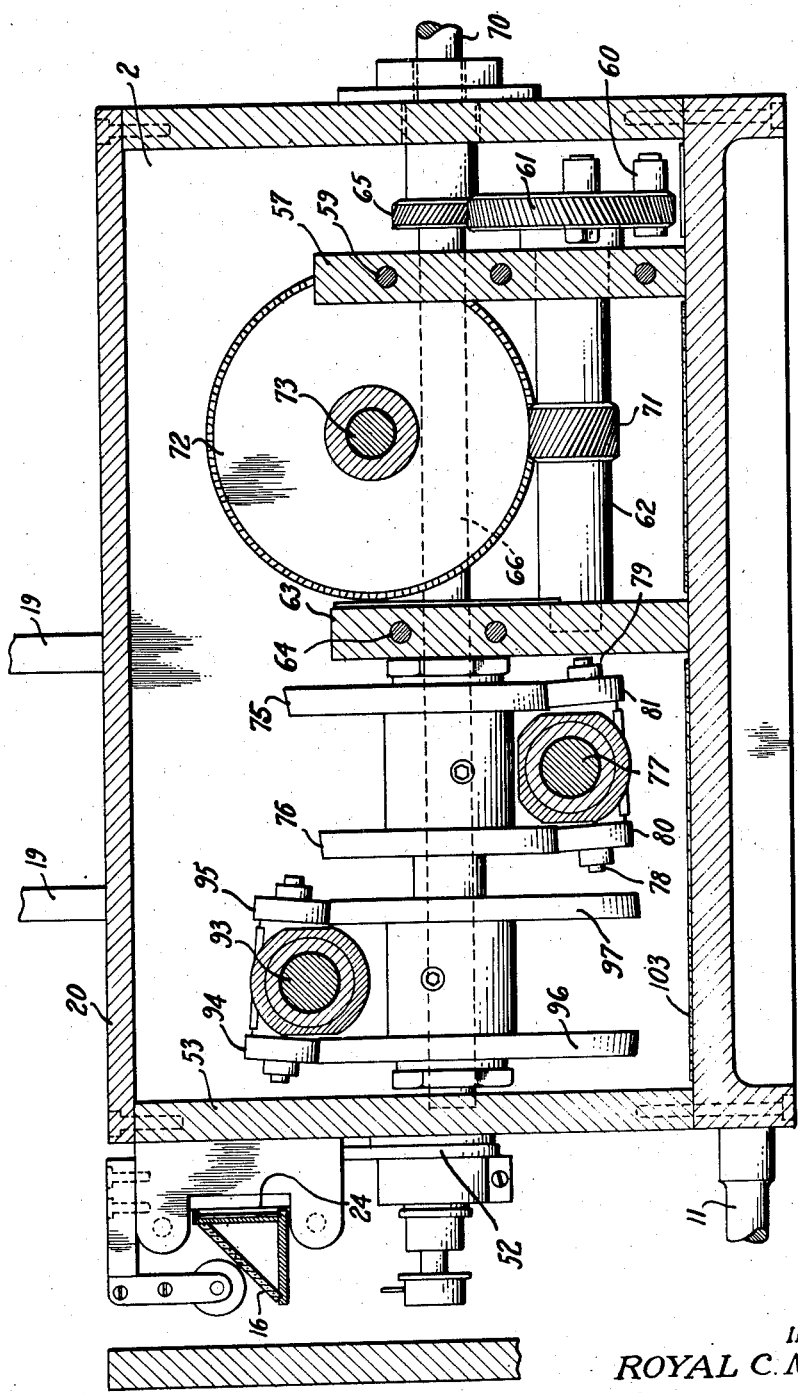
Fig. 2 is a sectional view of the camera on line 2—2 of Fig. 3, looking in the direction of the arrows with parts broken away and with the lid on the camera.

Motion picture film 7, from a supply reel, not shown, is threaded over the top of common sprocket 6 in Fig. 1 and is held thereon by a suitable pad roller 8, then at the back of exposure aperture plate member 9 to the lower side of sprocket 6 where it is held thereon by a suitable pad roller 10, the film then passing to a take-up reel, not shown.

Secured in front of the front of casing 2, by means of rods such as 11, is a bracket plate 12 having a suitable lens turret or objective lens 13 having a focusing adjustment, not shown. The plate 12 as partially indicated at the top left portion of Fig. 6 and as further shown in Fig. 8 carries an angle bracket 14 which carries a stationary mirror 15 facing downwardly at 45° to reflect light from the two reciprocating mirrors 16 and 17 shown in Fig. 4 to the viewfinder 18 which is mounted by suitable brackets such as 19 on the lid 20 of the camera, as shown in Fig. 8. Lid 20 is removably held in position by means such as screws 21.

Figure 3:
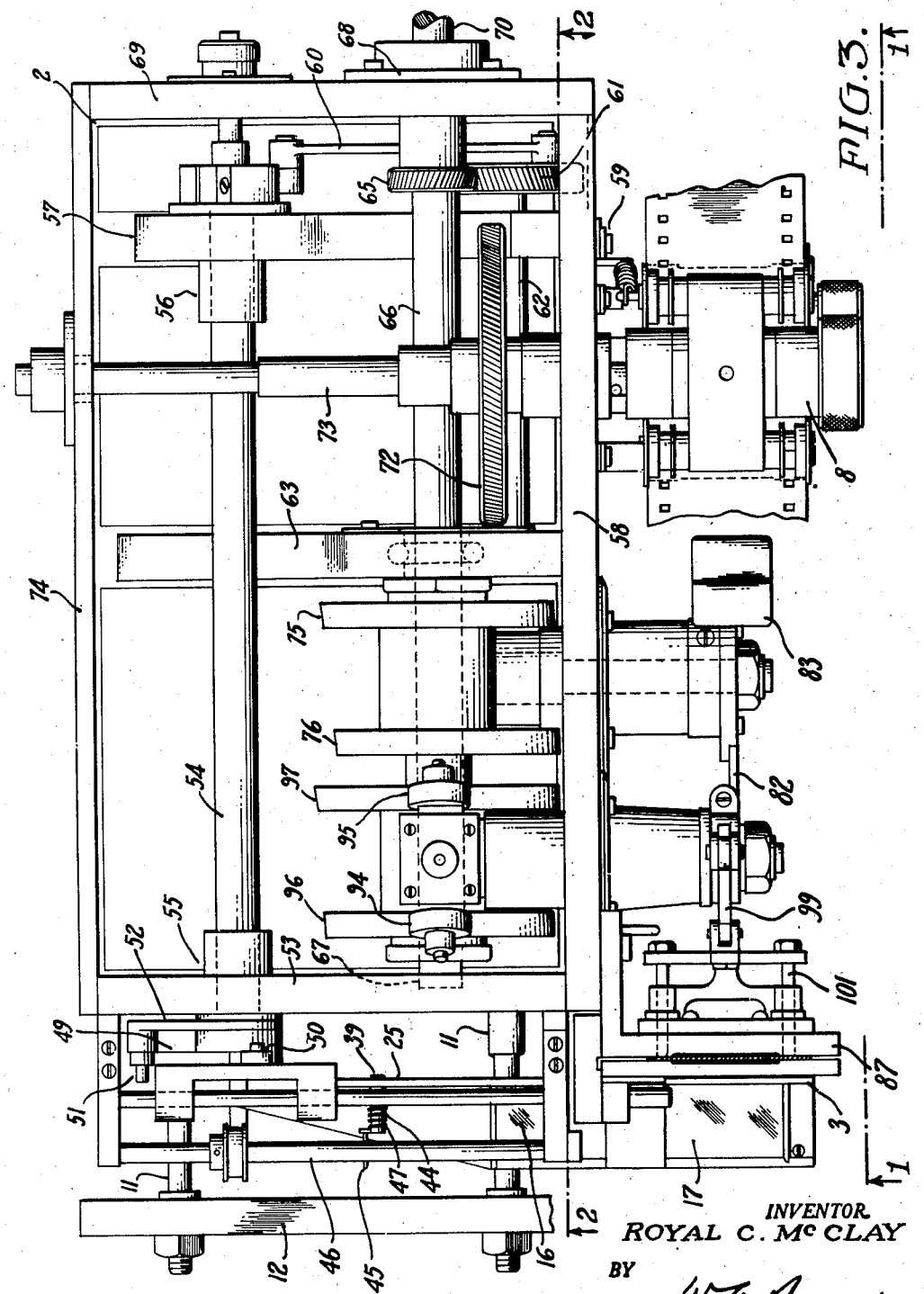
Fig. 3 is a top plan view of the camera, with the objective lens broken away and with the cover of the camera with its viewfinder removed.

As shown in Figs. 1, 2 and 3, the mirrors 16 and 17 slide across the optical axis through lens 13 and the exposure aperture 22 in the aperture plate 9, and mirrors 16 and 17 face lens 13 at an angle of 45° and at certain times reflect the photographic light coming through the lens 13, to the stationary mirror 15 in Fig. 8 to reflect it through the viewfinder 18, whereby the scene may be viewed in the viewfinder 18 during the time that the scene is photographed on the film 7.

Figure 4:
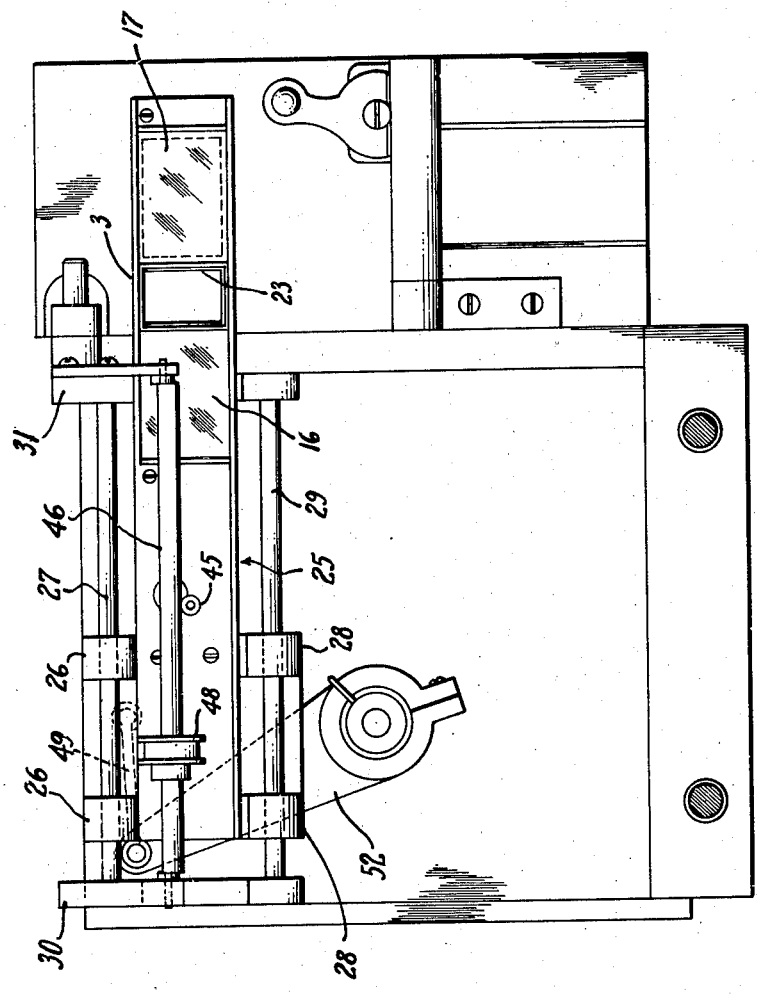
Fig. 4 is a front view in elevation on line 4—4 of Fig. 1 looking in the direction of the arrows.

The light which exposes the film 7, as shown in Fig. 4, passes between the adjacent ends of mirrors 16 and 17, through an inverted U-shaped hood 23, painted black to prevent reflection. Hood 23 is, of course, open at its front and rear ends to transmit light from lens 13 to the film 7 during that time when the hood 23 is in front of the exposure aperture 22, the transmission of such light being further controlled by a shutter 24.

Mirrors 16 and 17 are arranged at the front, and shutter 24 is arranged at the rear of a combined shutter and mirror slide 25 having as shown in Fig. 4 slide bearings 26 which slide on a rod 27, and slide bearings 28 which slide on a rod 29.

The rods 27 and 29 are supported in a parallel horizontal position at the front of the camera by suitable brackets 30 and 31. The hood 23 between the mirrors 16 and 17 is also carried on the front of the slide 25.

The shutter 24 as shown in Fig. 7 comprises two sheet metal pieces or leaves 32, 33, the adjacent edges 34 and 35 of which may be moved toward or away from each other to provide a light opening therebetween. The sheet metal leaves 32 and 33 are slidingly mounted at the rear of the slide 25 and slidably held therein by overhanging edges 36, 37 which may be bent over from the body of the slide 25 to provide a groove or space in which the leaves 32, 33 may slide. Leaf 32 has an extension 38 pivotally connected to one end of a lever 39 as indicated at 40 and leaf 33 has an extension 41 pivotally connected to the other end of lever 39 as indicated at 42. The extensions 38 and 41 at their inner ends are parallel to and guided for straight line movement by a block 43 which is integral with the slide 25. The central portion of lever 39 is fixed to a crank 44 journaled in block 43, the crank 44 having a handle 45 at the front of the slide 25 as shown in Figs. 3 and 4. The handle 45 is swung in one direction or the other to open or close the shutter 24, for example by means of an eccentric shaft 46, the handle 45 being held in engagement with the underside of shaft 46 by means of a suitable spring 47. Shaft 46 is raised or lowered to operate handle 45 by being rotated through a small angle, and it may be rotated by a pulley 48 having a suitable belt, not shown, which may extend to the rear of the camera.

The slide 25 is reciprocated by a connecting rod 49 pivotally connected at one end to the slide 25 as indicated at 50 and pivotally connected at its other end as indicated at 51 to a crank 52 at the outside of the front wall 53 of the camera. Crank 52 is rocked back and forth by a rock shaft 54 journaled as indicated at 55 in the front wall 53 and also journaled as indicated at 56 in a web 57 which is secured to the side wall 58 by means such as bolt 59. Rocking movement is imparted to shaft 54 by a connecting rod 60 (Fig. 3) connected to a spiral gear 61 on a countershaft 62 journaled in web 57 and in a web 63 also secured to the side wall 58 by means such as bolt 64. Gear 61 meshes with a spiral gear 65 on the drive shaft 66 which extends through the lubricating well, being journaled as indicated at 67 in the front wall 53 and as indicated at 68 in the rear wall 69. The drive shaft 66 extends through the rear wall 69 as indicated at 70 and is connected to a suitable motor or hand crank, not shown, for counter-clockwise rotation.

The countershaft 62 extends lengthwise of the casing 2, parallel to the drive shaft 66 and it carries a spiral gear 71 which drives a spiral gear 72 on a sprocket shaft 73 which extends at right angles to the countershaft 62 and drive shaft 66 and is journaled in the side wall 58 and also in the side wall 74. Sprocket shaft 73 extends through side wall 58 and the common sprocket 6 is fixed thereon.

Figure 6:
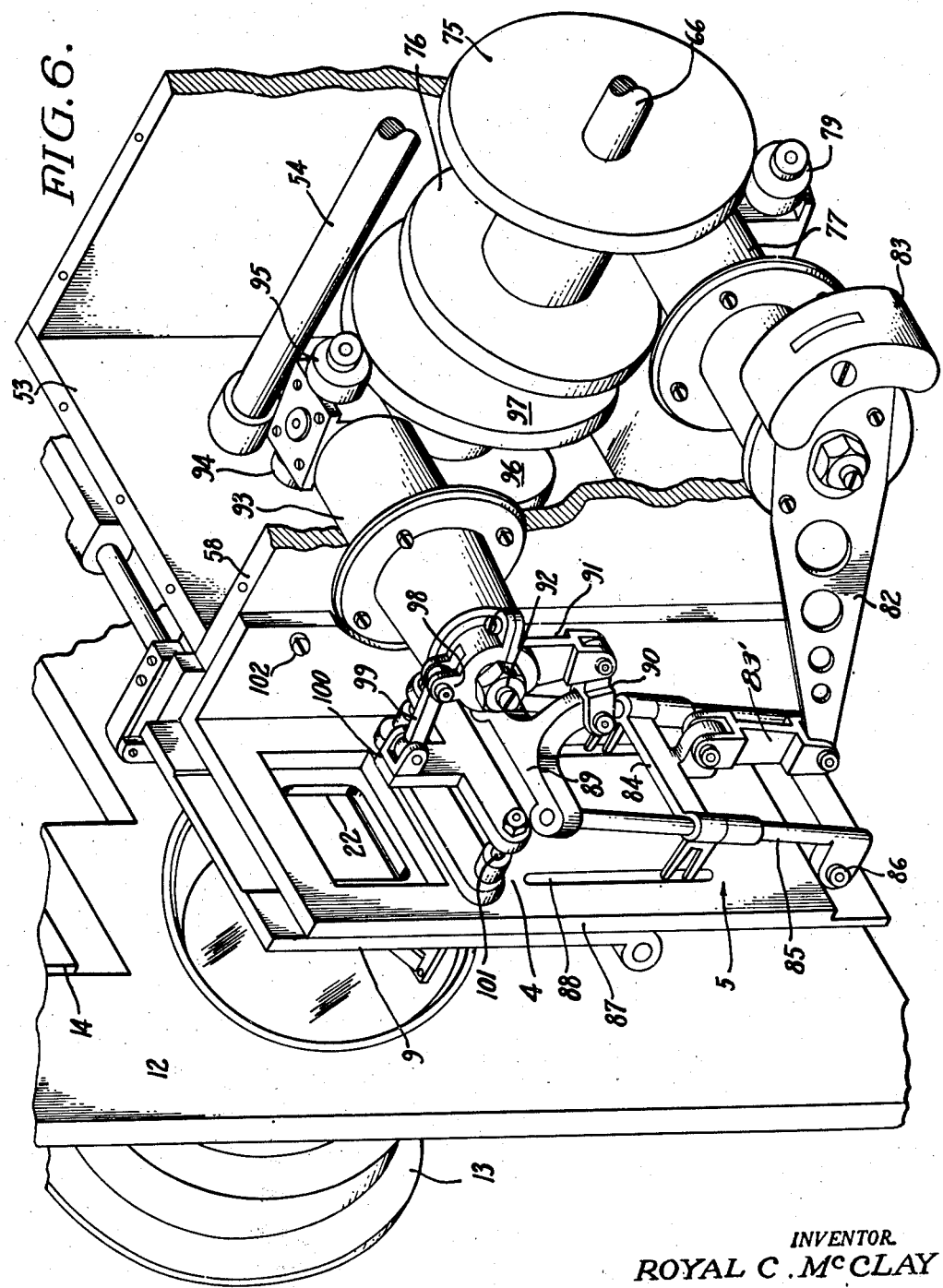
Fig. 6 is a perspective view of the camera with parts broken away with the lid removed.

Fixed to the drive shaft 66 is a pair of parallel spaced disc cams 75, 76 which impart rocking movement to a rock shaft 77 journaled in the side wall 58 below the drive shaft 66 and extending at right angles thereto. As shown in Fig. 2, rock shaft 77 has, in the lubricating well, axles 78, 79 which extend at right angles with the axis of shaft 77, and carry cam rollers 80 and 81 which engage the peripheries of and are actuated by the cams 75 and 76, respectively. As shown in Figs. 2 and 6 the contour of cam 75 is different from the contour of 76 and the radius of each thereof varies around the circle in such manner as to cause rocking movement of the shaft 77 at the proper time in the rotation of the drive shaft 66.

Rocking shaft 77 on the outside of the side wall 57 is fixed to a crank 82 carrying at one end a counterweight 83 and at the other end connected by a connecting rod or link 83' to the claw 84 to slide it up and down the claw frame 85. In other words, the rock shaft 77 imparts the up and down movement to the claw 84.

The claw frame 85 is pivotally supported at its lower end as indicated at 86 to the back plate 87 having longitudinal slots such as 88 through which the claws project to engage the film.

The register pins 4 and entire claw 5 with back plate 87 and aperture plate 9 comprise a movement mounting plate removably secured to the outside of the side wall 58 by means such as screws 102.

The upper end of the claw frame 85 carries a bracket 89 connected by a connecting rod 90 to a crank 91 on a rock shaft 92 on the outside of the side wall 58. Rock shaft 92 is similar to the one previously described, except that it is journaled as indicated at 93 in the side wall 58 above the drive shaft 66 where it carries, similar to that previously described, cam rollers 94 and 95 which engage two parallel spaced disc cams 96, 97, respectively, fixed to the drive shaft 66.

The rock shaft 92, through the crank 91, imparts in and out movement to the claw 84.

Rock shaft 92 also has an opposite crank 98 connected by a connecting rod or link 99 to the register pin bracket 100 to move the register pins 101 in and out at the proper time.

By reason of the fact that the claw 84 is moved up and down by a rocking movement of the rock shaft 77, and partly because the length of crank 82 is rather long, at least as compared to the length of cranks 91 and 98, it is apparent that the cams 75 and 76 need rotate through only a comparatively small angle to impart the up or down movement to claw 84, thereby leaving substantially more than 180° during which time the film may be held stationary in the camera by the pilot pins 101, to be impressed by the photographic light from lens 13. In other words, a shutter opening of more than 180° is made possible.

Figure 5:
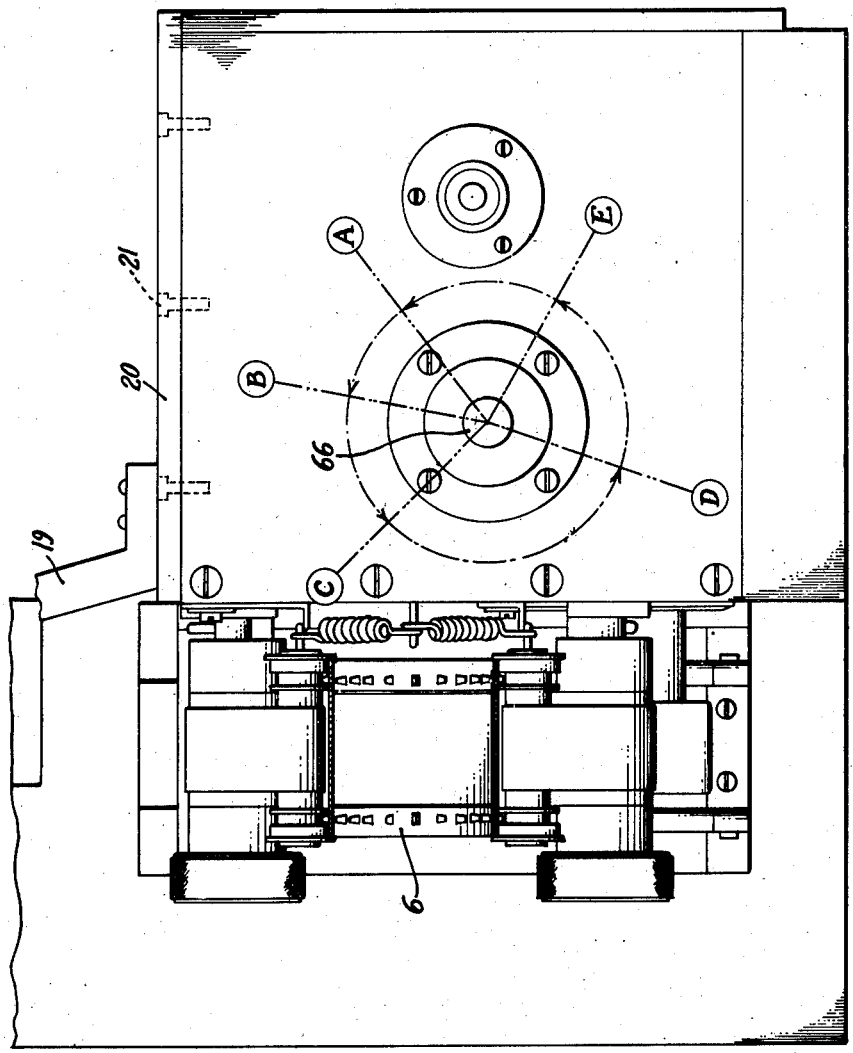
Fig. 5 is a rear view in elevation with notations A to E added thereto.

The sequence of operation of the shutter and film traversing mechanism will be further explained in connection with Fig. 5 wherein a complete revolution of the drive shaft 66 is subdivided into adjoining sectors or positions. In position A, the claw is out and just before the beginning of its pull-down stroke, the pilot pins 101 are in, and the shutter 3 is closed but has not quite reached the end of its stroke to the left as seen in Fig. 4.

In position B the film is engaged by the claw at the beginning of its pull-down stroke, the register pins are out and the shutter is closed. The film is pulled down from B to C, at the end of which the film is disengaged by the claw, the pilot pins are starting to move in and the shutter is beginning to open. The claw is disengaged at the bottom of its stroke at position C and is returned to the top of its stroke about 90° after C, the claw remaining idle from that position to position E. The film is stationary from position C to position E and with full shutter opening can be exposed over that period which is substantially more than 180°.

At position D the center of the hood 23 is vertically in line with the optical axis of the lens 13 and while the stationary mirror 15 is wider than the hood 23, only a portion of the image on the adjacent ends of mirrors 16 and 17 is reflected into mirror 15 at that time. However, mirror 17 is centered with mirror 15 shown in Fig. 8, when the position is vertical or slightly to the left of position B, at a time when crank 60 in Fig. 3 is in its extreme position towards side wall 58 and hence at this time drive shaft 66 moves through a wide angle such as about 90° without rocking shaft 54 or throwing mirror 17 out of reflective relation with mirror 15. Also, mirror 16 is centered with mirror 15 when spur gear 61 has revolved 180° from the position above described and shown in Fig. 3 where link 60 is again at its maximum distance away from the axis of shaft 62 and for about 90° around that position, mirror 16 also remains in reflective relation to mirror 15. From tests on a model constructed and arranged as shown in the drawings, it has been determined that the mirrors 16 and 17 remain in reflective relation to the mirror 15 and viewfinder 18 for a sufficient length of time to enable the operator to view the scene being photographed. As the mirrors 16 and 17 intercept the optical axis between the photographic lens 13 and the exposure aperture 22, the operator may see not only the identical scene being photographed, but do it while it is being photographed.

As the mirrors 16 and 17 reciprocate with the shutter 24, being arranged on opposite sides of the shutter opening through the hood 23, they intercept the light beam only at those times when the shutter 24 is closed and the light beam is not employed for photographing purposes. The film is pulled down at each end of the stroke of slide 25 and the film is stationary and exposed at the middle of each slide stroke.

The tests have shown that the apparatus is quiet in operation and this is due to the employment of rock shafts such as 77 and 93 for driving the film traversing mechanism, such shafts being driven by rotatable cams. Other drive elements employ spiral gears. Such spiral gears and cams are quiet in operation and are arranged in a lubricating well to provide constant lubrication to the working parts.

Pads such as 103 may be arranged at the bottom of the lubricating well to catch grit or particles of dirt in the lubricating fluid.

It will be apparent that various modifications may be made in the invention without departing from the spirit of the following claims.

I claim:

1. A camera comprising a casing serving as a lubricating well, said casing having side walls and end walls, a drive shaft in said casing journaled in said end walls and extending to the outside of one of said end walls, a spiral gear in said casing on said drive shaft, a countershaft in said casing having a companion spiral gear, a sprocket shaft journaled in said side walls and spiral gears in said casing connecting said sprocket shaft to said countershaft, said sprocket shaft extending to the exterior of one of said side walls and having a film sprocket thereon outside of said one side wall, a pair of cams in said casing on said drive shaft, a rock shaft journaled in said one side wall and extending to opposite sides thereof at one side of said drive shaft, said rock shaft having an inner end having a cross head having a cam roller for each of said cams, a film gate at the outside of said casing, said film gate having a film registering mechanism, an operative connection between said film registering mechanism and the outer end of said rock shaft, a second pair of cams in said casing on said drive shaft, a second rock shaft journaled in said one side wall at the other side of said drive shaft and extending to opposite sides of said one side wall, said second rock shaft having an inner end having a cross head having a cam roller for each cam of said second pair of cams, a pull-down mechanism outside of said side wall for said film gate, driving connections between both of said rock shafts and said pull-down mechanism, a shutter shaft in said casing journaled in said end walls, spiral gears in said casing connecting said drive shaft to said shutter shaft, and a shutter outside of said casing connected to said shutter shaft, said spiral gears and said cams and cam followers and their location in said casing which serves as a lubricating well comprising means contributing to quiet operation.

2. A camera casing having a side wall, an exposure aperture plate with film registering mechanism and pull-down mechanism therefor outside of said side wall, a pair of non-sliding rock shafts extending through said side wall transversely to the film path across said aperture plate, means outside of said casing for operatively connecting one of said rock shafts to said film registering mechanism, means outside of said casing for operatively connecting both of said rock shafts to said pull-down mechanism, and means inside of said casing for imparting rocking movement to said rock shafts.

3. A camera having an exposure aperture plate with register pins and a claw therefor, a pair of non-sliding rock shafts, means connected to one of said rock shafts for operating said register means in and out, means connected to said one rock shaft for operating said claw in and out, and means connected to said other rock shaft for operating said claw up and down.

4. A camera according to claim 3 wherein said other rock shaft which operates said claw up and down is positioned farther away from said aperture plate than said one rock shaft which operates said claw in and out, whereby said claw moves up and down at high speed with a small angular movement of said other rock shaft.

5. A camera having a pivoted claw frame, means supporting said frame for pivotal movement, a claw slidable on said frame, a rock shaft having a crank operatively connected to said frame to pivotally move said frame, a second rock shaft having a crank operatively connected to said claw to reciprocate said claw on said frame, a journal for each of said rock shafts, each of said journals supporting its said rock shaft for rocking movement about its axis, said journals supporting said shafts substantially parallel to each other, a drive shaft, and cam means on said drive shaft for rocking each of said rock shafts in its said journal.

6. A camera having a film movement, means for operating said movement comprising a rock shaft, an operative connection between said shaft and said movement, an axle secured to and extending cross-wise of said rock shaft at opposite sides thereof, a roller on each of said axles and a drive shaft extending crosswise of said rock shaft, said drive shaft having two parallel disc cams, the periphery of each of said cams engaging one of said rollers, said cams having dissimilar contours for imparting rocking movement to said rock shaft.

7. A fluid tight camera casing having a well for fluid lubricant, said casing well having a side wall, a sprocket shaft journaled in and extending through said side wall, a common supply and take-up sprocket on said shaft outside of said wall, a film movement mounting bracket having an exposure aperture and having a claw on said bracket, means for securing said bracket to said casing with said exposure aperture and claw offset from the outside of said side wall in line with said sprocket, a pair of non-sliding rock shafts journaled in said side wall transverse to the film path across said aperture, operative connections between said rock shafts and said claw, a shutter shaft extending through said well and journaled in said casing, a drive shaft in said well, and driving connections in said well between said drive shaft and said sprocket shaft, said rock shafts and said shutter shaft.

ROYAL C. McCLAY.

REFERENCES CITED

The following references are of record in the file of this patent:

UNITED STATES PATENTS

| Number | Name | Date |
| --- | --- | --- |
| 1,336,441 | Parkes | Apr. 13, 1920 |
| 1,360,341 | Williams | Nov. 30, 1920 |
| 1,891,585 | Vinten | Dec. 20, 1932 |
| 1,976,338 | Fritts | Oct. 9, 1934 |
| 2,374,318 | Wurger | Apr. 24, 1945 |